J. S. HADDEN.
LAWN SPRINKLING DEVICE.
APPLICATION FILED OCT. 19, 1911.
1,078,543.
Patented Nov. 11, 1913.
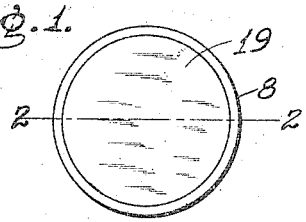
Fig. 1.
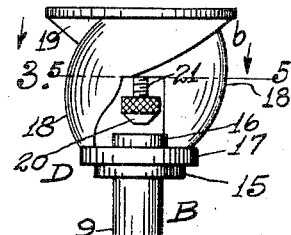
Fig. 3.
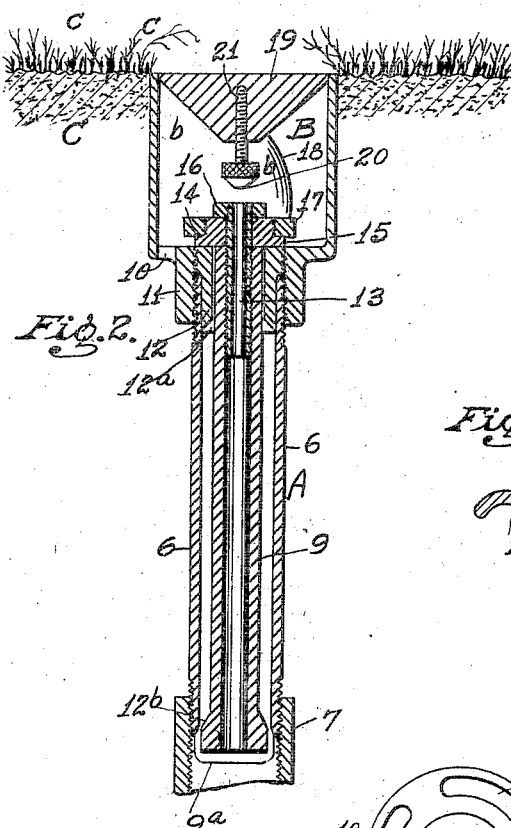
Fig. 2.
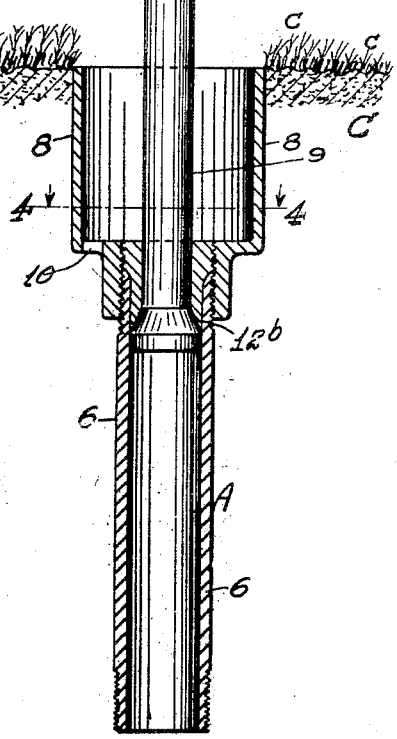
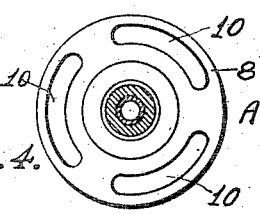
Fig. 5.
Fig. 4.
Witnesses:
W. F. Seeman
H. M. Fulmer
Inventor:
John S. Hadden;
By Raymond Bres Blakeslee,
his Attorney

UNITED STATES PATENT OFFICE.

JOHN S. HADDEN, OF HUNTINGTON PARK, CALIFORNIA, ASSIGNOR OF ONE-HALF TO FREDERICK H. JOHNSON, OF SOUTH PASADENA, CALIFORNIA.

LAWN-SPRINKLING DEVICE.

1,078,543.      Specification of Letters Patent.      Patented Nov. 11, 1913.

Original application filed June 13, 1911, Serial No. 632,967. Divided and this application filed October 19, 1911. Serial No. 655,584.

*To all whom it may concern:*

Be it known that I, JOHN S. HADDEN, a subject of the King of Great Britain, (who have declared my intention of becoming a citizen of the United States,) residing at Huntington Park, in the county of Los Angeles and State of California, have invented new and useful Improvements in Lawn-Sprinkling Devices, of which the following is a specification.

This invention relates to lawn sprinkling devices, and more particularly to that special class of lawn sprinkling means or devices which is or are permanently installed in position for use and service, being suitably connected with piping for supplying water.

In accordance with the present invention, I provide a sprinkling or spraying device for lawns which comprises an immovable member set into the turf, and a movable member co-acting therewith and provided with a specially organized part or portion for effectual spraying or sprinkling, such latter part or portion being normally chambered within and protected by the immovable member. This movable member is projected into operative position above the turf by the force of the head of water supplied to the device by a suitable service pipe, and when the head of water is cut off the movable member drops into housed position within the immovable member, within which it is thoroughly protected against damage or deterioration, and presents no obstruction to traverse of the lawn.

The invention has for its object to provide improvements in lawn sprinklers or sprayers of the general character stated which will be superior in point of relative simplicity and inexpensiveness of construction, positiveness in operation, length of life and durability, freedom from liability of damage or disruption and convenience in installation, and which will be generally superior in efficiency and serviceability.

The present invention is disclosed and was originally claimed in another application for Letters Patent filed by me June 13, 1911, Serial No. 632,967; and the present invention relates particularly to the movable member of the lawn sprinkling device and the organization thereof for effectually spraying or sprinkling.

With the above and other objects in view, the invention consists in the novel provision, formation, construction, combination, association and relative arrangement of parts, members and features, all as hereinafter described, shown in the drawing, and finally pointed out in claims.

In the drawing, Figure 1 is a top plan view of a lawn sprinkling or spraying device constructed and organized in accordance with the invention; Fig. 2 is a central vertical section of the same, taken upon the line 2—2, Fig. 1, and the device being shown as installed in a turfed lawn, the parts being in inoperative position; Fig. 3 is a view similar to Fig. 2, the parts being shown in operative position; Fig. 4 is a detail transverse sectional view, taken upon the line 4—4, Fig. 3, and looking in the direction of the appended arrows; and Fig. 5 is a partial detail transverse sectional view taken upon the line 5—5, Fig. 3, and looking in the direction of the appended arrows.

Corresponding parts in all the figures are designated by the same reference characters.

Referring with particularity to the drawing, A designates the immovable member and B designates the movable member of a sprinkling device or sprinkling or spraying means organized and constructed in accordance with the invention, the immovable member being installed in the lawn formation in connection with a suitable service pipe not shown, extending beneath the surface of the lawn, which is designated at C, *c* designating spears of grass which, as shown in Fig. 2, may overlie both members A and B when the movable member is in lowered or inoperative position; such blades of grass being thrust aside by the member B as it is projected upwardly into operative position as shown in Fig. 3. The member B is provided with a water directing portion *b* whereby the water passed to the same, as hereinafter described, is broken up *en masse* and directed in the form of spray or finely divided particles over the adjacent lawn area. The member B is preferably rotatively mounted in connection with the member A, and the water directing portion *b* is formed to cause the rotation of the member B and thus effect or enhance the performance of distributing the water as last stated. The impact of the water upon the water directing portion *b* causes the rotation of the member B.

The member A comprises a tubular body 6 which is connected with the service pipe as by a threaded coupling 7, and is provided at its upper end with a tubular casing 8, the upper portion of which is open and installed so as to be flush with the surface of the lawn formation.

The member B comprises a tubular stem 9 beneath the lower end of which is secured a wire loop 9ª as a guard to prevent the stem 9 from displacement, the stem 9 being of smaller external diameter than the internal diameter of the tubular body 6, and carrying at its upper end the water directing portion *b* which is mounted upon the stem 9 by a bearing device D which enables the portion *b* to rotate upon the upper end of the stem 9. Normally, the stem 9 is chambered in the body 6, and the portion *b* and the bearing device D are chambered in the casing 8, the bearing device D limiting the downward movement of the member B when the latter is in chambered position, by engagement of the bearing device D with the bottom of the tubular casing 8. The tubular casing 8 is of enlarged diameter, with relation to the tubular body 6, and the bottom portion of the former, exteriorly of the body 6, is provided with a plurality of openings 10 which permit water or other substances collecting in the casing 8 to pass downwardly out of said casing and into the earth.

The lower end of the casing 8 is provided with a downwardly extending tubular nipple 11 within which is threaded, at its upper portion, a tubular nipple 12 the lower portion of said nipple 12 being spaced from the lower portion of the nipple 11 so as to permit the tubular body 6 to be engaged with the same threads, whereby the nipple 12 at its upper portion is threaded to the nipple 11. The lower portion of the tubular nipple 12 is formed into a conical valve seat 12ª ground to fit a corresponding conical valve or head 12ᵇ fitted to the lower end of the tubular stem 9. The valve or head 12ᵇ is seated upon the valve seat 12ª when the stem 9 is in raised position. A slight play is allowed between the valve head 12ᵇ and the inner wall of the body 6, and between the stem 9 and the inner wall of the tubular nipple 12, to prevent clogging of the movement of the member B, as by sand or other foreign substances, which are permitted to escape through the small spaces provided between the stem 9 and the nipple 12 and between the head 12ᵇ and the body 6. The lower end of the body 6 is disposed in a plane slightly above the lower conical portion of the valve head 12ᵇ, when the same is in extreme lowered position, and is countersunk or beveled slightly to conform to the conical formation of the valve head 12ᵇ.

Into the upper end of the stem 9 is screwed a tubular bearing member 13 which projects above the upper end of the tube 9 and is surrounded by an annular bearing member 14, having a base flange 15 which rotates upon the upper end of the stem 9, the bearing member 14 being held to the bearing member 13 by a lock-nut 16 threaded upon the upper end of the bearing member 13. The parts 13, 14 and 16 constitute the bearing device D and are preferably formed of suitable material to withstand corrosive and erosive action.

Threaded upon the annular bearing member 14, exteriorly of the same, is a base-ring 17 from which rise two diametrically opposed curved deflectors or blades 18, having opposite vertical curvature and transverse outer edge curvature as shown in Fig. 5, said blades expanding laterally upwardly and merging into a conical flat-topped crown 19. The parts 17, 18 and 19, together with an adjustable water regulating and spreading device, constitute the water directing portion *b*; said device consisting of a downwardly directed conical head 20 disposed centrally between the plates or blades 18 directly over the upper end of the tubular bearing member 13, and having a screw-shank 21 threaded in a suitable chamber in the conical crown 19, so that the head 20 may be adjusted toward or away from the upper end of the bearing member 13 through which water issues after traversing the tubular stem 9. The water striking upon the conical head 20 is directed thereby to the curved plates or blades 18 which causes, by re-action, rotation of the water directing portion *b*, and projection of the spray or finely divided water laterally from the portion *b* and over the lawn surface, the base-ring 17 and bearing member 14 rotating upon the bearing member 13. The quality of the spray, and the nature of its deflection or direction by the portion *b*, will be determined by the position of adjustment of the conical head 20. When the head of water is turned off, the parts will be in the positions shown in Fig. 2, with the stem 9 chambered in the body 6, and the water directing portion *b* chambered in the casing 8. When the water is turned on, it urges the stem 9 with the portion *b* upwardly, projecting the parts of the member B into the positions shown in Fig. 3, the valve head 12ᵇ acting as a piston under impact of the water. When the valve head contacts with the valve seat 12ª, all of the water is forced to pass through the stem 9 and the tubular bearing member 13 so as to be directed against the plates or blades 18 and the conical crown 19, causing rotation of the water directing portion *b*, as above stated, and a broad scattering or spraying of the finely divided water over the lawn surface. When the water is turned off, the member B and its parts drop into housed positions, as above stated, and as shown in Fig. 2, wherein they are effectually protected from damage or deterioration, the uppermost portion of the same being flush with the surface of the lawn formation C. The several parts and members may be readily taken apart for cleansing or repair, or for packing, and the thread formations are such that rotation of the member B tends to cause a tightening of the several threaded connections.

I do not desire to be understood as limiting myself to the specific provision, formation, construction, combination, association and relative arrangement of parts, members and features shown and described; but reserve the right to vary the same, in adapting the improvements to varying conditions of use, without departing from the spirit of the invention and the terms of the following claims.

Having thus described my invention, I claim and desire to secure by Letters Patent:—

1. In a device of the character described, a member comprising a tubular stem, and a water directing portion rotatively mounted upon said stem in position to receive water traversing said stem; said water directing portion being provided with an adjustable device disposed above said tubular stem.

2. In a device of the character described, a member comprising a tubular stem, and a water directing portion rotatively mounted upon said stem in position to receive water traversing said stem; said water directing portion being provided with an adjustable device disposed above said tubular stem; there being a conical crown above said adjustable device.

3. In a device of the character described, a member comprising a tubular stem, and a water directing portion rotatively mounted upon said stem in position to receive water traversing said stem; said water directing portion being provided with an adjustable device disposed above said tubular stem, there being a conical crown above said adjustable device and a curved blade disposed beneath said conical crown.

4. In a device of the character described, a tubular stem provided at its upper end with a bearing device, a plurality of curved blades rotatively mounted upon said bearing device laterally of the orifice of said tubular stem and provided with a conical crown into which the upper ends of said blades merge; said blades being formed with transverse curvature adjacent to their outer edge portions; and an adjustable conical head disposed intermediate of said blades and above the orifice of said tubular stem.

In testimony whereof, I have signed my name to this specification in the presence of two subscribing witnesses.

JOHN S. HADDEN.

Witnesses:
RAYMOND I. BLAKESLEE,
H. M. FULMER.